United States Patent
Freeman et al.

(10) Patent No.: US 8,310,815 B2
(45) Date of Patent: Nov. 13, 2012

(54) HIGH VOLTAGE AND HIGH EFFICIENCY POLYMER ELECTROLYTIC CAPACITORS

(75) Inventors: Yuri Freeman, Greer, SC (US); Yongjian Qiu, Greenville, SC (US); Steven C. Hussey, Simpsonville, SC (US); Philip M. Lessner, Newberry, SC (US)

(73) Assignee: Kemet Electronics Corporation, Greenville, SC (US)

( * ) Notice: Subject to any disclaimer, the term of this patent is extended or adjusted under 35 U.S.C. 154(b) by 330 days.

(21) Appl. No.: 12/426,516

(22) Filed: Apr. 20, 2009

(65) Prior Publication Data

US 2010/0265634 A1    Oct. 21, 2010

(51) Int. Cl.
*H01G 9/042* (2006.01)
*H01G 9/045* (2006.01)
*H01G 9/02* (2006.01)

(52) U.S. Cl. .................................... 361/529; 361/525
(58) Field of Classification Search ............. 361/529, 361/531, 535, 536, 525, 538
See application file for complete search history.

(56) References Cited

U.S. PATENT DOCUMENTS

| | | | | |
|---|---|---|---|---|
| 3,419,386 A | * | 12/1968 | Holland et al. | 419/14 |
| 3,466,508 A | * | 9/1969 | Booe | 361/536 |
| 3,581,159 A | * | 5/1971 | Piper et al. | 361/532 |
| 4,537,641 A | | 8/1985 | Albrecht et al. | 148/11.5 |
| 7,679,885 B2 | * | 3/2010 | Mizusaki et al. | 361/529 |
| 7,760,487 B2 | * | 7/2010 | Karnik | 361/528 |
| 2006/0180474 A1 | * | 8/2006 | Fujimoto et al. | 205/213 |
| 2007/0064376 A1 | | 3/2007 | Merker et al. | 361/528 |
| 2008/0010797 A1 | | 1/2008 | Qiu et al. | 29/25.03 |
| 2009/0034163 A1 | * | 2/2009 | Kabe et al. | 361/528 |
| 2009/0161299 A1 | * | 6/2009 | Nemoto et al. | 361/532 |

FOREIGN PATENT DOCUMENTS

| | | | |
|---|---|---|---|
| JP | 63296333 A | * | 12/1988 |
| JP | 05159987 A | * | 6/1993 |

OTHER PUBLICATIONS

*Critical oxygen content in porous anodes of solid tantalum capacitors*, Yu et al., Journal of Materials Science: Materials in Electronics 9 (1998) 309-211.
International Search Report, PCT/US2010/031801, Nov. 30, 2010. Min Byung Jo.
Written Opinion of the International Searching Authority, PCT/US2010/031801, Nov. 30, 2010. Min Byung Jo.

* cited by examiner

*Primary Examiner* — David M Sinclair
(74) *Attorney, Agent, or Firm* — Joseph T. Guy; Nexsen Pruet, LLC

(57) ABSTRACT

A capacitor, and method of making a capacitor, is provided wherein the capacitor has exceptionally high break down voltage. The capacitor has a tantalum anode with an anode wire attached there to. A dielectric film is on the tantalum anode. A conductive polymer is on the dielectric film. An anode lead is in electrical contact with the anode wire. A cathode lead is in electrical contact with the conductive polymer and the capacitor has a break down voltage of at least 60 V.

20 Claims, 4 Drawing Sheets

HIGH VOLTAGE AND HIGH EFFICIENCY POLYMER ELECTROLYTIC CAPACITORS

BACKGROUND

The present invention is related to an electrolytic capacitor. More specifically the present invention is related to an electrolytic capacitor comprising intrinsically conductive polymeric cathode layers capable of achieving a high break down voltage (BDV) which were not previously available with polymeric cathode layers.

Solid electrolytic capacitors with intrinsically conductive polymers as the cathode material have been widely used in the electronics industry due to their advantageous low equivalent series resistance (ESR) and "non-burning/non-ignition" failure mode. Intrinsically conductive polymer, more commonly known as conductive polymer, is electrically conductive in the molecular level. In other words, a single molecule (a polymer chain) of this type of polymer is conductive, which distinguishes itself from other groups of polymeric materials whose electrical conductivity is imported from the presence of foreign conductive particles. The example of the latter is polyester (non-conductive) filled with carbon back (conductive particles). The intrinsically conducting polymer can exist in many physical forms including solid, solution, and liquid dispersion.

The backbone of a conductive polymer consists of a conjugated bonding structure. The polymer can exist in two general states, an undoped, non-conductive state, and a doped, conductive state. In the doped state, the polymer is conductive but of poor processability due to a high degree of conjugation along the polymer chain, while in its undoped form, the same polymer loses its conductivity but can be processed more easily because it is more soluble. When doped, the polymer incorporates anionic moieties as constituents on its positively charged backbone. In order to achieve high conductivity, the conductive polymers used in the capacitor must be in doped form after the completion of processing, although during the process, the polymer can be undoped/doped to achieve certain process advantages.

Various types of conductive polymers including polypyrrole, polyaniline, and polythiophene are described for use in Ta capacitors. The major drawback of conductive polymer capacitors, regardless of the types of conductive polymers employed, is their relatively low working voltage compared to their $MnO_2$ counterparts. Since their introduction to the market, the working voltages of Polymer Ta capacitors has been limited to 25 V, while the working voltages of Solid Ta capacitors ($MnO_2$ cathode) available on the market can reach 75 V and the working voltage of Wet Ta capacitors can reach 150V. This limitation has made applications of polymer Ta capacitors in high voltage circuits impossible which is where the combination of low ESR and non-burning failure mode are most critical.

During manufacture the Ta powder is mechanically pressed to make Ta metal pellets. The pellets are subsequently sintered at high temperature under vacuum. The sintered anodes are then anodized in a liquid electrolyte at elevated temperature to form a cohesive dielectric layer ($Ta_2O_5$) on the anode surface. Increasing formation voltage increases the dielectric thickness, which determines the maximum voltage the anodes can withstand. Polymer cathodes are conventionally applied to tantalum capacitors by synthesis from the monomer and an oxidizing agent. This is known as 'in-situ' polymerization. Typically the anodes are prepared by the steps of dipping in oxidizing agent, drying, dipping in monomer, reacting the monomer and oxidizing agent to form conductive polymer and washing of byproducts not necessarily in this order. Optionally, a reform step may be applied after washing to reduce DC leakage of finished capacitors.

With reference to FIG. 2, there is a large increase in leakage current at about 35 V for both capacitors comprising a polymeric cathode (In-Situ Ctrl and In-Situ Test) despite the formation voltage being 125 V. This can be compared to $MnO_2$ cathode, which does not show an appreciable increase of leakage current until about 70 V, and the wet, sulfuric acid, cathode which does not show an appreciable increase in leakage current until about 120 V. The dielectrics for both the $MnO_2$ and wet devices were also formed to 125 V. Thus, despite the high formation voltage, it would be difficult to rate polymer capacitors above about 25 V.

After formation of the polymer coating graphite and silver are applied to allow adhesion to the cathode lead. The manufacturing process is then continued by assembling, molding and tested the capacitors.

The rating voltage for Ta capacitors, or the working voltage allowed for reliable operation, is primarily a function of dielectric thickness. Dielectric thickness is controlled by the formation voltage. Increasing the formation voltage increases the dielectric thickness. It is estimated that for every volt applied during the dielectric formation process, about 1.7~2 nm of dielectric is formed on the surface. For a given anode, increasing dielectric thickness is at a cost of capacitance loss since the anode capacitance is inversely proportional to dielectric thickness. It is a common practice for solid Ta capacitor manufacturers to use a formation voltage which is 2.5 to 4 times higher than the anode rated voltage. This ensures high reliability during applications. For example, a 10V rated capacitor often employs an anode formed at 30V.

A plot of the BDV versus the formation voltage for a wide range of Ta capacitors including both polymer (polyethyldioxythiophene, or PEDOT) and $MnO_2$ based capacitors is shown in FIG. 1.

As shown FIG. 1, in the low formation voltage region ($\leqq 30V$), the BDV of both polymer and $MnO_2$ capacitors are close to the anode formation voltages. However, there is a trend of divergence in terms of BDV between $MnO_2$ and polymer capacitors as formation voltage increases from about 80V to 200V. In this range, while the BDV of $MnO_2$ parts still increases with increasing formation voltage, the BDV of polymer capacitor shows a mostly flat pattern. This has been interpreted in the art to indicate a limit of about 50V which is almost unaffected by the increasing formation voltage. Increasing dielectric thickness, which is the most important and commonly used approach to make high voltage capacitors, is virtually ineffective for making high voltage polymer capacitors beyond about 25V ratings. Due to this phenomenon the Ta industry has had difficulty producing reliable conducting polymer capacitors for use above 25 V. A 35V rated capacitor, for example, would require a BDV of far greater than 50V to ensure its long term reliability (e.g. 35V rated $MnO_2$ parts have an average BDV of 95V. While not limited to any theory it is postulated that the polymer/dielectric interface can cause the differences in BDV.

In recent years conductive polymers have received considerable attention. This material is a suspension of conductive polymer in a solvent. Instead of the conventional method of applying the conductive polymer by in-situ synthesis from the monomer and an oxidizing agent, the polymer can now be applied by dipping in the slurry and removing the solvent. Again with reference to FIG. 2 the leakage current vs. voltage behavior of the slurry polymer cathode compares favorably to the in-situ formed cathode. A significant improvement is obtained. Large leakage currents do not flow until about 75 V.

Thus, devices of 35 V ratings can be manufactured. However, even with these polymer slurry cathodes, leakage current performance is still unsatisfactory. Wet tantalum devices with formation voltages of 125 V would be expected to be rated up to 70 V. Thus, a significant improvement in rated voltage of tantalum capacitors with polymer cathodes is still needed if they are to compete with wet tantalum capacitors in higher voltage ratings.

It is known in the art, that reducing the oxygen and carbon content of the anodes leads to the formation of a better quality dielectric. It has been demonstrated on tantalum capacitors with wet and $MnO_2$ cathodes that reduction of oxygen and carbon contents can significantly improve the long term reliability of the capacitors. However, little improvement is noted in the initial performance. This is show in FIGS. 3a and 3b for a tantalum capacitor with a $MnO_2$ cathode. It would not be expected that reduction of oxygen and carbon contents of the anode would improve the initial performance of tantalum capacitors with polymer cathodes. Indeed, applying these state of the art processing techniques in combination with conventional methods of depositing conductive polymer leads to only a very small improvement in performance. FIG. 1 shows that applying these techniques leads to only a few volts improvement in where the leakage current increases as indicated in the 'in-situ test'. The combination of polymer deposited by an in-situ method and the best anode technology still leads to a device that cannot compete in rated voltage with $MnO_2$ or wet capacitors. Thus, these capacitors still fall short of meeting the goal of replacing $MnO_2$ or wet capacitors with a lower ESR device at rated voltages above 25 V.

There has been a long standing desire in the art to provide a capacitor comprising a conducting polymeric cathode suitable for use at higher rated voltages. Through diligent research the present inventors have achieved what was previously not considered feasible.

SUMMARY OF THE INVENTION

It is an object of the invention to provide a capacitor comprising a conducting polymer with a high breakdown voltage.

It is another object of the invention to provide a method for forming a capacitor with a conducting polymer while maintaining a high breakdown voltage and low ESR.

These and other advantages, as will be realized, are provided in a capacitor. The capacitor has a tantalum anode with an anode wire attached there to. A dielectric film is on the tantalum anode. A conductive polymer is on the dielectric film. An anode lead is in electrical contact with the anode wire. A cathode lead is in electrical contact with the conductive polymer and the capacitor has a break down voltage of at least 60 V.

Yet another embodiment is provided in a method for forming a capacitor comprising:
compressing tantalum powder into a tantalum anode wherein the tantalum anode has no more than 0.15 ppm/uC/g oxygen and has no more than 50 ppm carbon;
anodizing the tantalum anode to form dielectric;
dipping the anodized anode into a slurry of conductive polymer;
drying the conductive polymer; and
providing a first external termination in electrical contact with the tantalum anode and a second external termination in electrical contact with the conductive polymer.

DETAILED DESCRIPTION OF THE INVENTION

Provided herein is an improved capacitor and method for making the improved capacitor. More particularly, provided herein is a capacitor comprising a conducting polymeric cathode with a break down voltage of over 100 V and ESR of no more than 500 mohms in the range of operating temperatures −55 C-125 C. This was previously considered unavailable to those of skill in the art. More preferably, the capacitor has a break down voltage of over 150 V and even more preferably the capacitor has a break down voltage of over 200 V.

The invention will be described with reference to the various figures forming an integral part of the instant specification.

Figure 1:
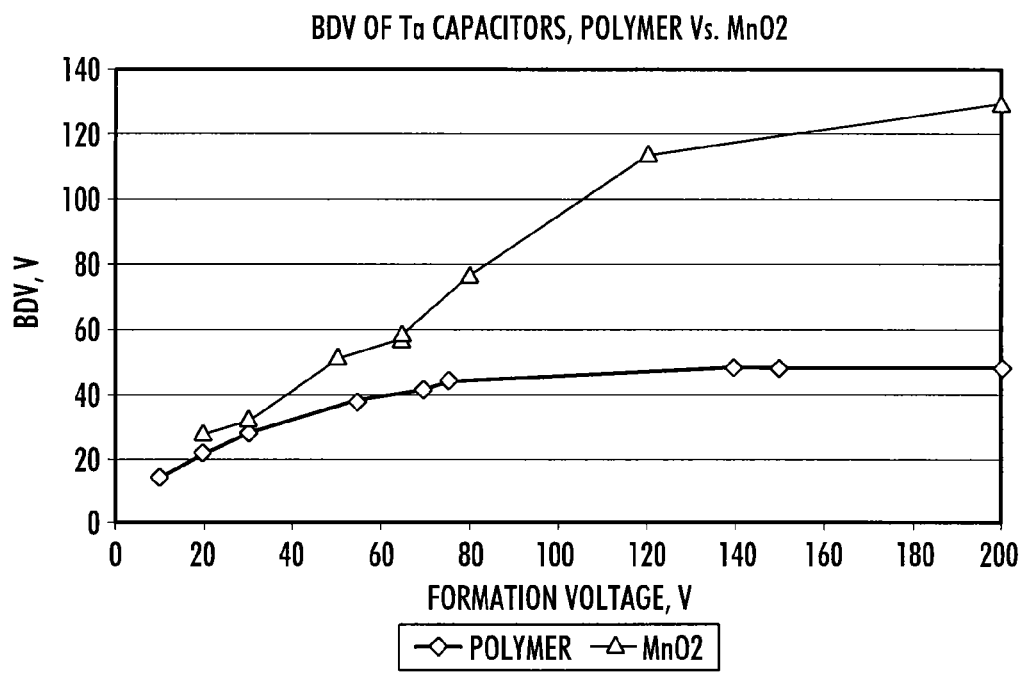
FIG. 1 illustrates graphically the break down voltage of capacitors comprising polymeric cathodes compared to the corresponding break down voltage for capacitors comprising $MnO_2$ cathodes.
Figure 2:
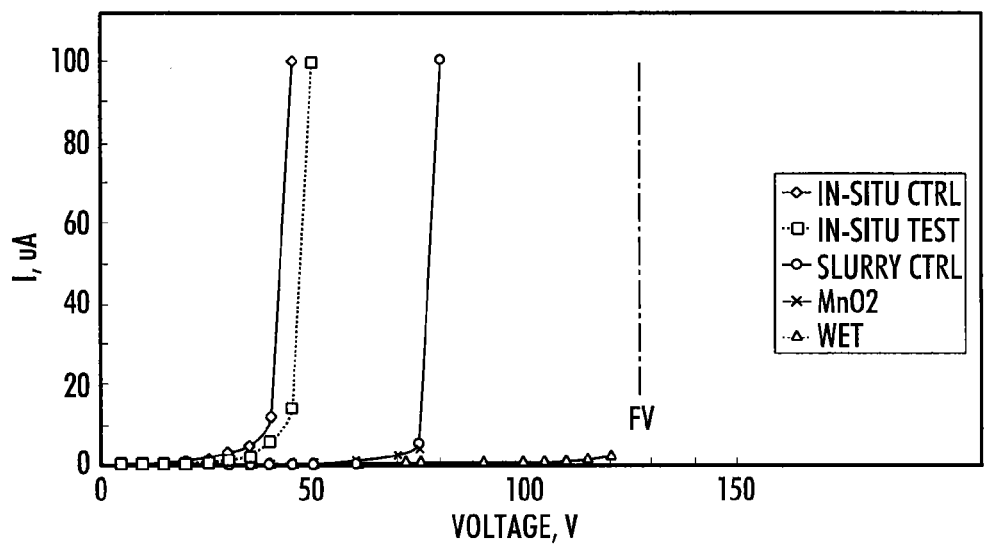
FIG. 2 graphically illustrates DC Leakage Current vs. Voltage of Polymer Tantalum Capacitors with Dielectric Formed at 125 V Compared to Tantalum Capacitors with a $MnO_2$ Cathode and a Wet (Sulfuric Acid) Cathode Also Formed at 125 V.
Figure 3A:
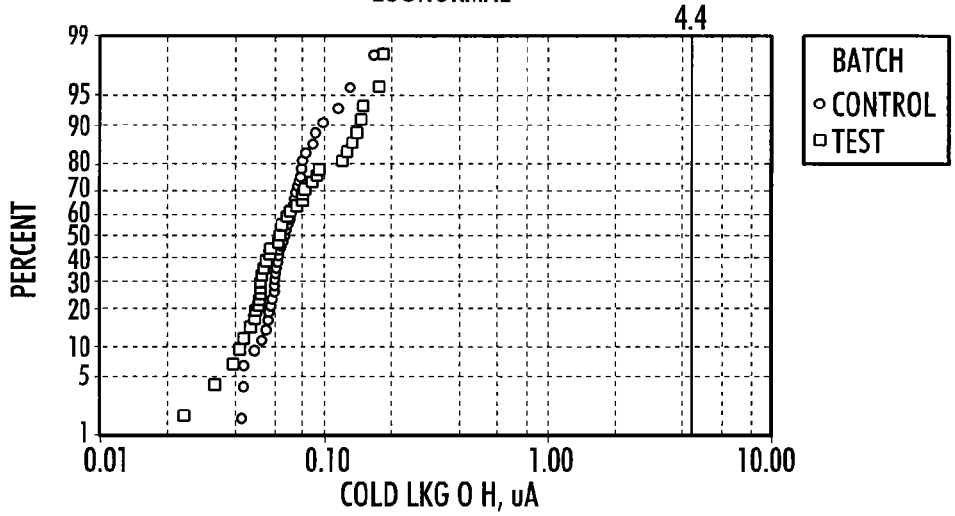
FIG. 3a graphically illustrates initial leakage current distribution of $Ta/Ta_2O_5/MnO_2$ devices with standard anode (Control) and anode with low carbon and oxygen content (Test).
Figure 3B:
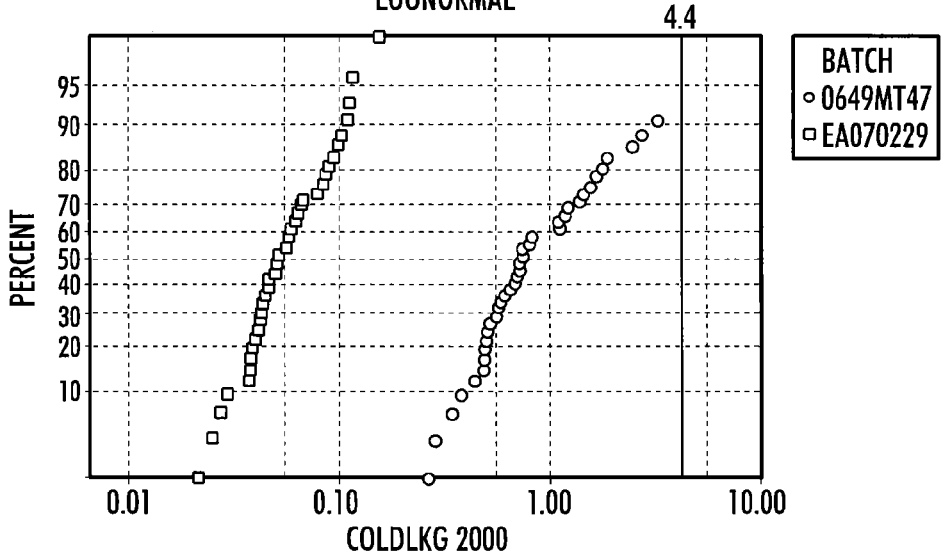
FIG. 3b graphically illustrates leakage current distribution after 2000 hours at 85° C. and 1.32×Vrated of $Ta/Ta_2O_5/MnO_2$ devices with standard anode and anode with low carbon and oxygen content.
Figure 4:
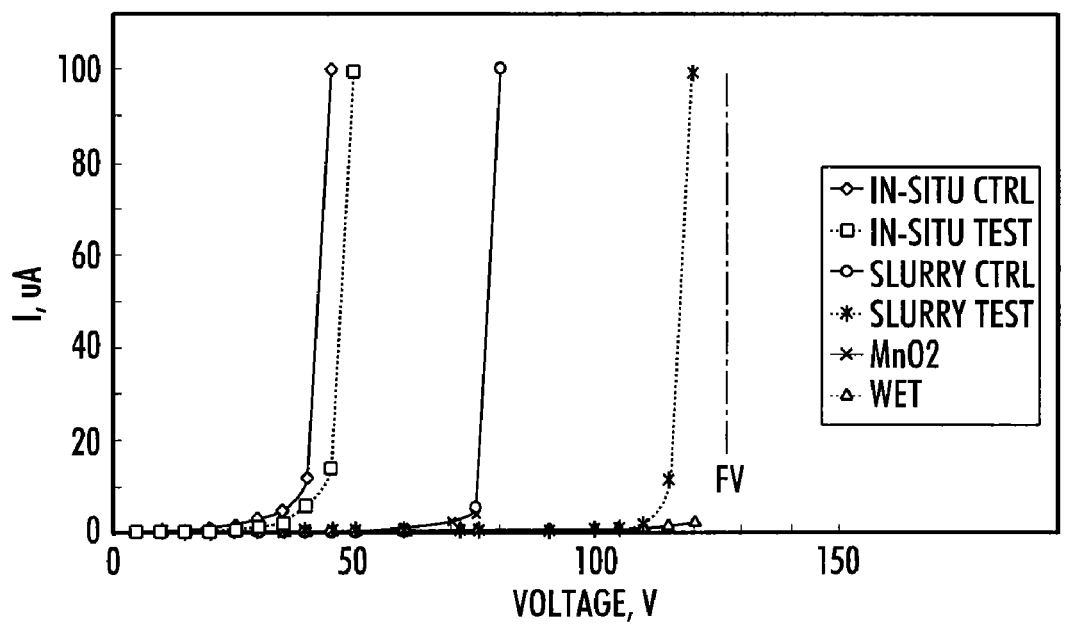
FIG. 4 graphically illustrates DC Leakage Current vs. Voltage of Polymer Tantalum Capacitors with In-Situ Polymer and Slurry Polymer Compared to Tantalum Capacitors with MnO2 and Wet Cathodes.
Figure 5:
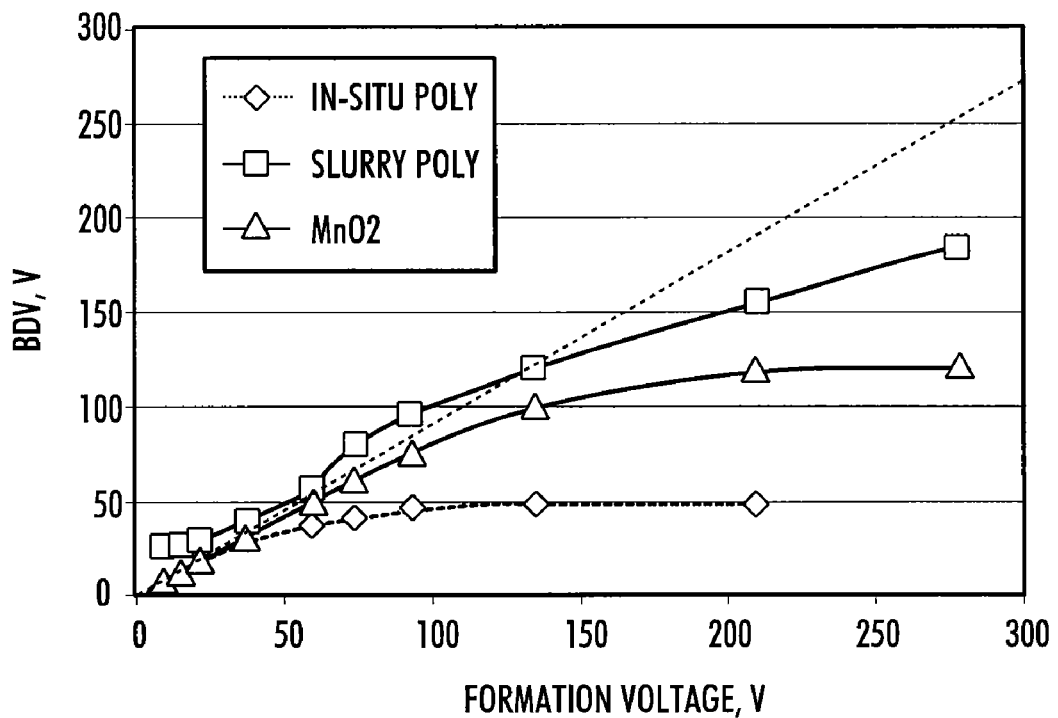
FIG. 5 illustrates graphically the break down voltage of capacitors comprising test anodes and polymeric cathodes (both in-situ and slurry) compared to the corresponding break down voltage for capacitors comprising $MnO_2$ cathodes.

Based on previous results with $MnO_2$ cathodes, wet cathodes, and in-situ polymer based on the same polymer backbone as the slurry polymer, it was expected that applying the best anode processing techniques and growing the best dielectric film would only result in a small improvement in initial leakage current characteristics. The complexity of applying a slurry polymer has therefore led those of skill in the art to the simpler in-situ process. However, to our surprise, a synergistic improvement in leakage current and BDV was realized with a combination of polymer slurry and anode processing techniques that result in low concentrations of both oxygen and carbon in the tantalum. FIGS. 4 and 5 illustrate the results graphically. The leakage current and BDV characteristics for the combination of polymer slurry deposition and an anode with low oxygen and low carbon content, the "Slurry Test" exceed those of the Ta—$MnO_2$ system and are nearly equal to those of the Ta—$H_2SO_4$ system. The results greatly exceed the expectations of a skilled artisan when using conductive polymer cathodes.

In general, wet capacitors rapidly increase ESR at low temperature. In general, higher ESR relates to small case-size parts.

This has led to the unexpected realization that applying slurry containing pre-made intrinsically conducting polymer over a tantalum anode with a low concentration of oxygen and carbon provides a capacitor which was previously considered impossible. It is most preferred that the polymer have a molecular weight of at least about 500 to no more than about 10,000,000. Below about 500 the polymer chains are of insufficient length to offer high conductivity and to form a coating with sufficient physical integrity. Above about 10,000,000 the polymeric chain is too large to form an adequate slurry.

Formation of a low oxygen and low carbon tantalum anode, and measurement thereof, is provided in "Critical Oxygen Content In Porous Anodes Of Solid Tantalum Capacitors", Pozdeev-Freeman et al., *Journal of Materials Science: Materials In Electronics* 9, (1998) 309-311 which is incorporated herein by reference. Tantalum powders with a charge of 30,000 CV/g or less are preferably used in preparing the anodes. The particle size is preferably defined as having an average radius (r) of 1.2 μm to 4 μm. It is preferred that the anode have no more than 0.15 ppm/uC/g oxygen and more preferably no more than 0.1 ppm/uC/g oxygen. It is preferred that the anode have no more than 50 ppm carbon and more preferably no more than 10 ppm carbon.

The invention will be described with reference to the FIG. 6 forming a part of the present application.

Figure 6:
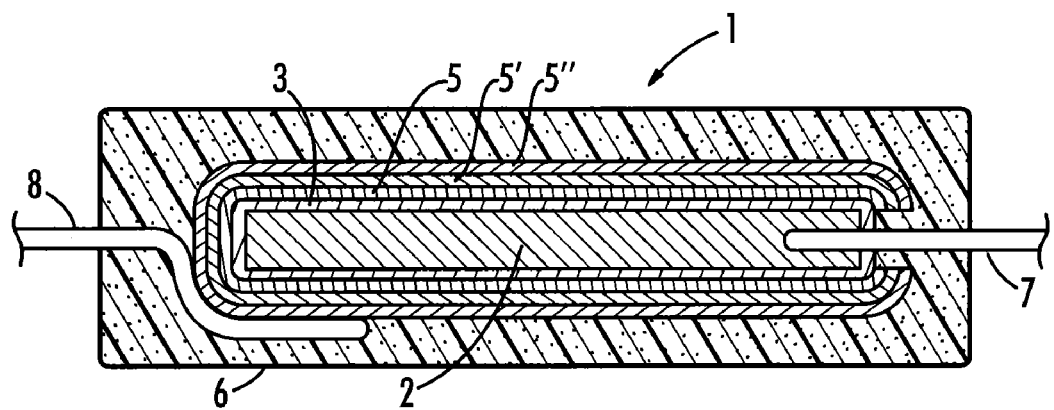
FIG. 6 illustrates a capacitor of the present invention.

In FIG. 6, a cross-sectional view of a capacitor is shown as represented at 1. The capacitor comprises an anode, 2, comprising tantalum. A dielectric layer, 3, is provided on the surface of the anode, 2. The dielectric layer is preferably formed as an oxide of tantalum as further described herein. Coated on the surface of the dielectric layer, 3, is a polymeric conducting layer, 5, which also has carbon, 5', and silver top-coating, 5". An anode lead, 7, and cathode lead, 8, provide contact points for attaching the capacitor to a circuit. The entire element, except for the terminus of the leads, is then preferably encased in an exterior moulding, 6, which is preferably an organic and more preferably a epoxy resin.

Figure 7:
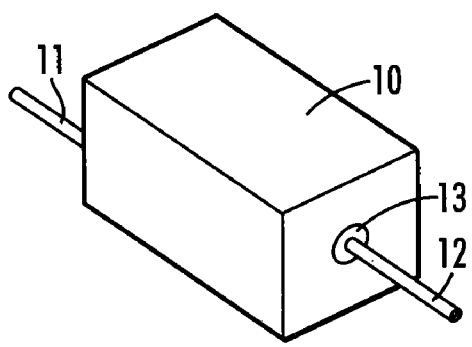
FIG. 7 illustrates a capacitor of the present invention.

An alternative embodiment is illustrated in FIG. 7. In Fig. the moulding, 10, may be a hermetic metal casing with the cathode lead, 11, electrically attached thereto preferably by welding. The anode lead, 12, passes through an insulator, 13, to avoid electrical contact with the metal casing.

The anode is typically prepared by pressing tantalum powder and sintering to form a compact. For convenience in handling, the tantalum metal is typically attached to a carrier thereby allowing large numbers of elements to be processed at the same time.

An anode lead is attached to the anode. In one embodiment the anode lead is inserted into the tantalum powder prior to pressing wherein a portion of the anode wire is encased by pressure. For the present invention it is more preferred that the anode lead be welded to the pressed anode.

It is most desirable that the dielectric of the anode be an oxide of tantalum. The oxide is preferably formed by dipping the valve metal into an electrolyte solution and applying a positive voltage to the valve metal thereby forming $Ta_2O_5$.

The formation electrolytes are not particularly limiting herein. Preferred electrolytes for formation of the oxide on the tantalum metal include diluted inorganic acids such as sulphuric acid, nitric acid, phosphoric acids, aqueous solutions of dicarboxylic acids, such as ammonium adipate. Other materials may be incorporated into the oxide such as phosphates, citrates, etc. to impart thermal stability or chemical or hydration resistance to the oxide layer.

The conductive polymer layer is preferably formed by dipping the anodized valve metal anodes into a slurry of intrinsically conductive polymer. It is preferred that the anode be dipped into the slurry from 1 to 15 times to insure internal impregnation of the porous anodes and formation of an adequate external coating. The anode should remain in the slurry for a period of about 0.5 minute to 2 minutes to allow complete slurry coverage of its surface.

The conductive polymer is preferably selected from polyaniline, polypyrrole and polythiophene or substitutional derivatives thereof.

A particularly preferred conducting polymer is illustrated in Formula 1:

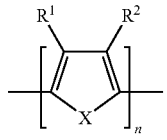

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Carbon paste layers and silver paste layers are formed for attaching electrode leads as known in the art. The device is then sealed in a housing.

Other adjuvants, coatings, and related elements can be incorporated into a capacitor, as known in the art, without diverting from the present invention. Mentioned, as a nonlimiting summary include, protective layers, multiple capacitive levels, terminals, leads, etc.

EXAMPLES

A comparison of the ESR for devices made from a combination of low oxygen and carbon anodes and three different cathode systems using $H_2SO_4$ (wet) and $MnO_2$ each with slurry polymer (poly) measured at room temperature is provided in Table 1. In each case the pellet and dielectric formation where identical. The ESR of the polymer system is ½ that of the $MnO_2$ system and ⅕ that of the wet system. Thus, a very low ESR polymer system with a high voltage rating has been realized which was previously considered impossible.

TABLE 1

| Cathode | D | L | A/Aw | ESR (Ohm) |
|---|---|---|---|---|
| Wet | 0.1 | 0.25 | 1 | 1.75 |
| MnO2 | 0.075 | 0.12 | 33% | 0.75 |
| Poly | 0.075 | 0.12 | 33% | 0.3 |

In Table 1, D is anode diameter, L is anode length, A/Aw is a ratio between anode surface in Solid capacitor (A) and Wet capacitor (Aw) and ESR is equivalent series resistance in ohms.

Oxygen content in sintered Ta anodes is measured by LECO Oxygen Analyzer and includes oxygen in natural oxide on Ta surface and bulk oxygen in Ta particles. Bulk oxygen content is controlled by period of crystalline lattice of Ta, which is increasing linearly with increasing oxygen content in Ta until the solubility limit is achieved. This method was described in "Critical Oxygen Content In Porous Anodes Of Solid Tantalum Capacitors", Pozdeev-Freeman et al., *Journal of Materials Science: Materials In Electronics* 9, (1998) 309-311 wherein X-ray diffraction analysis (XRDA) was employed to measure period of crystalline lattice of Ta. According to this invention, oxygen in sintered Ta anodes is limited to thin natural surface oxide, while the bulk of Ta is practically free of oxygen.

Another comparison is provided in Table 2 and illustrated graphically in FIG. 5.

TABLE 2

| FV | In-situ | Slurry | MnO₂ |
|---|---|---|---|
| 9 | 6.1 | 26.5 | 6 |
| 15 | 13 | 27 | 14 |
| 22 | 20.5 | 28.8 | 20.5 |
| 37 | 28.9 | 38.9 | 32 |
| 59 | 37 | 57.5 | 50 |
| 74 | 41.1 | 80.2 | 61 |
| 93 | 46 | 95 | 75 |
| 135 | 48 | 120 | 100 |
| 210 | 48 | 155 | 118 |
| 280 | | 185 | 120 |

In Table 2, FV is formation voltage, In-situ refers to in-situ formation of polymeric cathode, Slurry refers to a polymeric cathode prepared by slurry deposition and MnO2 refers to the anode. In each case the anode was within the inventive levels.

This invention has been described with particular reference to the preferred embodiments without limit thereto. One of skill in the art would realize additional embodiments and alterations without deviating from the scope of the invention which is more particularly set forth in the claims appended hereto.

The invention claimed is:

1. A capacitor comprising:
a tantalum anode with a charge of no more than 30,000 CV/g comprising an anode wire attached there to wherein said tantalum anode has no more than 50 ppm carbon and no more than 0.15 ppm/µC/g oxygen;
a dielectric film on said tantalum anode;
a conductive polymer on said dielectric film;
an anode lead in electrical contact with said anode wire;
a cathode lead in electrical contact with said conductive polymer; and
wherein said capacitor has a break down voltage of at least 75 V.

2. The capacitor of claim 1 wherein said capacitor has a break down voltage of at least 100 V.

3. The capacitor of claim 2 wherein said capacitor has a break down voltage of at least 150 V.

4. The capacitor of claim 1 wherein said capacitor has an ESR of no more than 500 mohms in the range of operating temperatures −55 C to 125 C.

5. The capacitor of claim 1 wherein said conductive polymer has a molecular weight of at least 500 to about 10,000,000.

6. The capacitor of claim 1 wherein said conductive polymer is selected from polyaniline, polypyrrole, polythiophene, and derivative thereof.

7. The capacitor of claim 6 wherein said conductive polymer is polyethyldioxythiophene.

8. The capacitor of claim 1 wherein said anode wire is tantalum.

9. The capacitor of claim 1 further comprising a carbon coating between said conductive polymer and said cathode lead.

10. The capacitor of claim 9 further comprising a metallic coating between said carbon and said cathode lead.

11. The capacitor of claim 10 where said metallic coating comprises silver flake in an organic binder.

12. The capacitor of claim 1 where said anode wire is welded to said tantalum anode.

13. The capacitor of claim 1 further comprising an organic molding encasing said capacitor.

14. The capacitor of claim 1 further comprising a hermetically sealed encasement.

15. The capacitor of claim 14 wherein said hermetically sealed encasement is a metallic can.

16. The capacitor of claim 15 wherein said anode lead passes through an insulator in said metallic can.

17. The capacitor of claim 16 wherein said cathode lead is welded directly to said metallic can.

18. The capacitor of claim 1 wherein said dielectric is $Ta_2O_5$.

19. The capacitor of claim 1 wherein said tantalum anode has no more than 10 ppm carbon.

20. The capacitor of claim 1 wherein said tantalum anode has no more than 0.1 ppm/µC/g oxygen.

* * * * *